Feb. 25, 1930.                    Y. TANAKI                    1,748,741
BROILER AND TOASTER
Filed Jan. 5, 1928
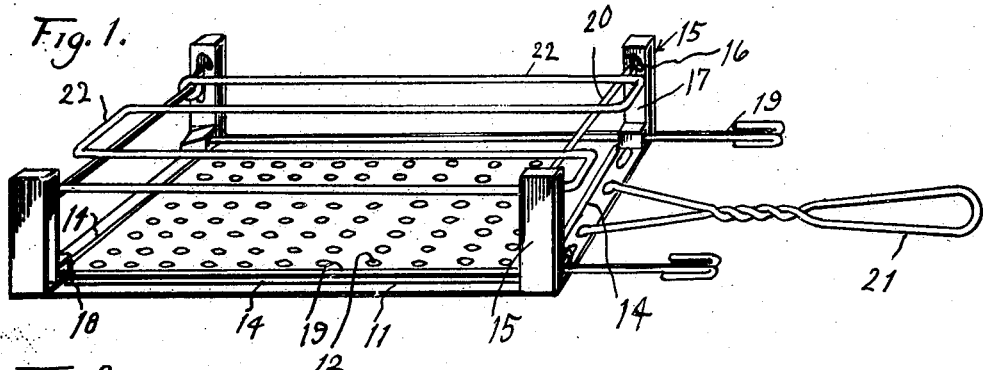
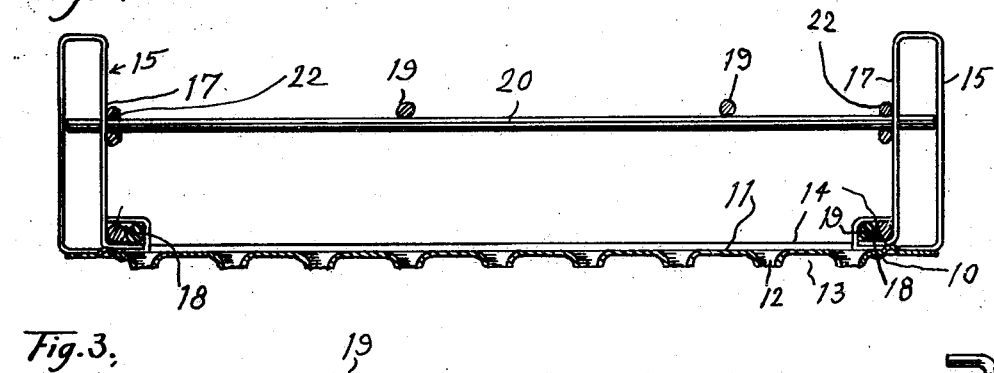
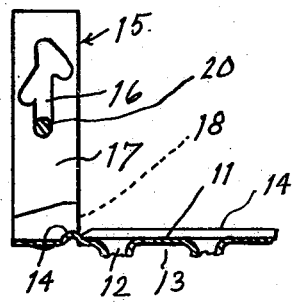
INVENTOR:
YOSHITOMO TANAKI.
BY ATTY:

UNITED STATES PATENT OFFICE

YOSHITOMO TANAKI, OF LOS ANGELES, CALIFORNIA, ASSIGNOR TO TOMOAKI TANAKI, OF LOS ANGELES, CALIFORNIA

BROILER AND TOASTER

Application filed January 5, 1928. Serial No. 244,682.

This invention relates to that class of culinary utensils known as "broilers", and has for its objects to provide a simple and efficient device which will have a minimum contact surface supporting the substance or thing to be broiled; which will convey the juices and grease emanating from foods being broiled, into suitable gutters, from which they may be readily collected, which will facilitate the turning of the foods while being broiled, which will apply the heat indirectly so that the foods will not be scorched or burned, which will prevent any smoke from the flame reaching the foods, and which allows for an adjustment of the foods relatively to and from the heat or combustion flames.

Other advantages of this invention consist of detachable forks for supporting the foods on the broiler, ease of cleaning the same and the broiler after use, rapidity of heating, distribution of the heat, and no marks left on the broiled foods.

In carrying out my invention I provide a corrugated and perforated metal plate which is adapted to be positioned over the heat-producing flames, bracket members above and apart therefrom, detachable forks adapted to be supported in operative position on the bracket members, and to support the foods to be broiled, and other structural elements which are effective for accomplishing the objects of the invention.

In the preferred form of my invention, the metal plate which forms the base, is provided with perforations. These openings project from the plane of the base, and have ragged edges. These ragged edges distribute the heat from the flame more quickly. The flames are around the openings in the spaces between them. These openings permit the heat to pass but not the flames, and the irregular surface thus formed will radiate more heat than would a plane surface.

The preferred means by which I have accomplished the objects of my invention are illustrated in the accompanying drawings, and are hereinafter specifically described. That which I believe to be new is set forth in the annexed claims.

In the drawings, Figure 1 is a perspective view of a toaster and broiler embodying the features of this invention. Fig. 2 is a transverse sectional elevation of the broiler. Fig. 3 is a detail view of an impaling fork which is employed with the present invention. Fig. 4 is a fragmentary and sectional detail view, showing a standard and the slot therein.

In the practical construction of my improved combined broiler and toaster, the base portion 11 is provided with perforations 12, which have the edges thereof projecting downwardly. This leaves the remaining space in the form of corrugations 13, in which the flames from combustion may travel. Therefore, only the heat will pass through the perforations 12, and no smoke will reach the food that is to be broiled. The ragged edges of the perforations tend to distribute the heat quickly. The corrugations 14 tend to retain grease and liquids emanating from the broiling food, upon the base portion.

At each corner of the base, I provide supporting standards 15, secured by rivets 10, and which have slots 16, on their inner sides 17, and have other openings 18, which are adapted to retain the detachable forks 19, when they are not in use. Supporting bars 20, are mounted in slots 16, in standards 15. It may be noted that the slots 16 are so formed as to provide for maintaining the bars 20 in different positions relative to the base, to hold the food that is to be broiled at the proper distance from the heat radiating base. The forks 19 are each formed from a straight bar, and, in use, are disposed on the supporting bars 20, and transversely relative thereto. The food to be broiled, is impaled on the forks, and, to obtain a uniform result, the forks are manually turned during the broiling step. I provide a handle 21, fixed to the base, for other handling of the broiler. The forks, being detachable, are retained in openings 18, when not in use. Food that is impaled on the forks, will not show any marks when done. A wire frame 22, pivotally secured to one of the bars 20, is adapted, when in position above the base, to be used for broiling purposes or for toasting purposes.

When in use, either for broiling or toasting purposes, the food will not contact with the base, and will not be burned.

The toasting frame 22, when in operative position, will be supported by the remaining supporting bar 20, and may be adjusted to and from the base, by adjustment of bars 20 in their respective slots 16.

From the foregoing description and drawings, it may be seen that I have provided an efficient broiling and toasting device which will broil or toast the food without marking, scorching or burning the same, which distributes the heat evenly, and which may be easily cleaned when the food is finally broiled or toasted, the device being applicable for analogous culinary purposes.

I claim:

1. In a broiler, a base member comprising a metal plate having a series of perforations therein, and the walls of said perforations extending downwardly relative to the plane of the base member, supporting standards one at each corner of the base member, supporting bars mounted on the standards, and adjustable to and from the base member, and a frame having a pivotal connection with one of the supporting bars and resting on the opposite supporting bar in operative position over the base member.

2. In a broiler, a base member having perforations therein, standards projecting from the base member, supporting bars mounted in the standards, and detachable impaling forks mounted on the supporting bars and extending above the base member in operative position, and adapted to be carried by the standards in inoperative position.

In testimony whereof, I have hereunto affixed my signature.

YOSHITOMO TANAKI.